Figure 1:
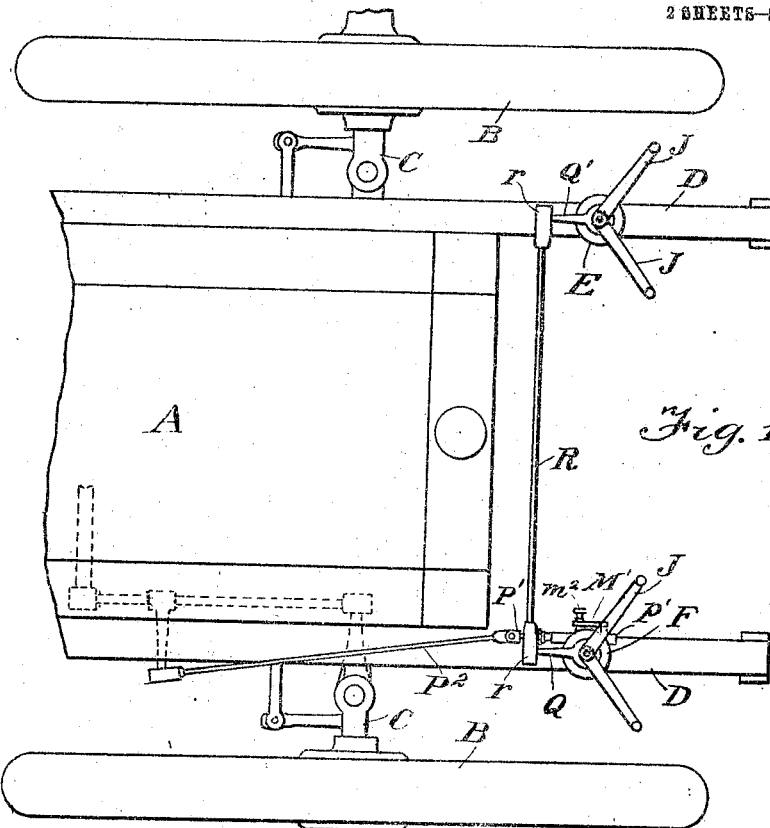

O. B. WOODFIELD, O. M. MORRIS & J. W. GOSLING.
HEADLIGHT FOR AUTOMOBILES.
APPLICATION FILED JULY 25, 1910. RENEWED JUNE 6, 1911.

1,014,429.

Patented Jan. 9, 1912.

2 SHEETS—SHEET 1.

WITNESSES
Robert Head
J. F. Mothershead

INVENTORS
Otis B. Woodfield
Otto M. Morris and
John W. Gosling
BY
Griffins Bernhard
ATTORNEYS O. B. WOODFIELD, O. M. MORRIS & J. W. GOSLING.
HEADLIGHT FOR AUTOMOBILES.
APPLICATION FILED JULY 25, 1910. RENEWED JUNE 6, 1911.
1,014,429.
Patented Jan. 9, 1912.
2 SHEETS—SHEET 2.
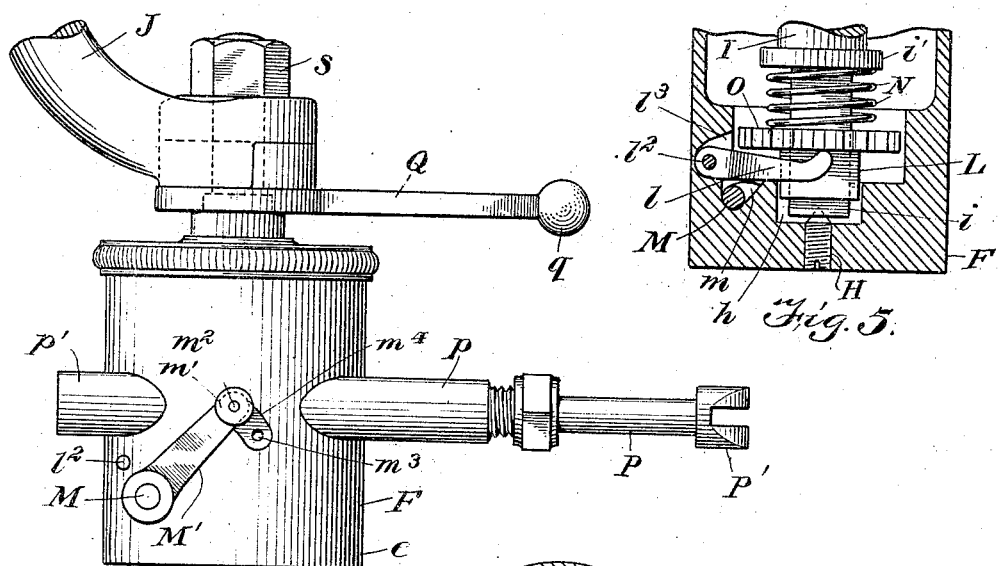
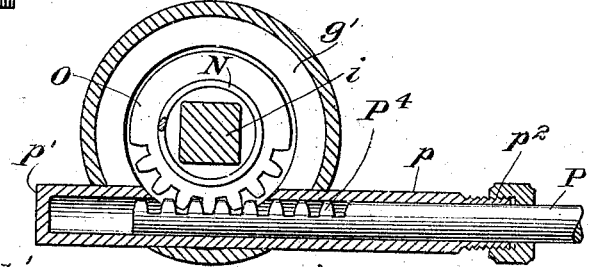
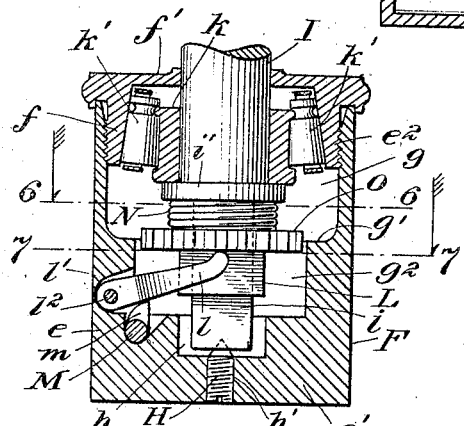
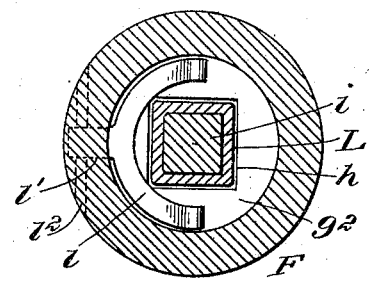
WITNESSES
Robert Head
J. F. Mothershead
INVENTORS
Otis B. Woodfield,
Otto M. Morris and
John W. Gosling
BY Griffins Bernhard
ATTORNEYS

UNITED STATES PATENT OFFICE.

OTIS B. WOODFIELD, OTTO M. MORRIS, AND JOHN W. GOSLING, OF SPRING LAKE BEACH, NEW JERSEY.

HEADLIGHT FOR AUTOMOBILES.

1,014,429.  Specification of Letters Patent.  Patented Jan. 9, 1912.

Application filed July 25, 1910, Serial No. 573,762. Renewed June 6, 1911. Serial No. 631,566.

*To all whom it may concern:*

Be it known that we, OTIS B. WOODFIELD, OTTO M. MORRIS, and JOHN W. GOSLING, citizens of the United States, all residing in Spring Lake Beach, county of Monmouth, and State of New Jersey, have invented a certain new and useful Headlight for Automobiles, of which the following is a specification.

This invention is a head light adapted for use in connection with vehicles, and more particularly automobiles which are ordinarily equipped with a plurality of head lights.

It is usual to employ two head lights at the front part of an automobile, said lights being positioned at the respective sides of the vehicle and operating to project the rays of light in advance of the front wheels, whereby the road will become lighted up to enable the driver to steer the vehicle out of the way of obstructions. Such head lights are, usually, supported in stationary positions upon the vehicle, but in a prior application filed by us as joint inventors on Feb. 5, 1910, Serial No. 542,220, we provide means controllable by a part of the vehicle steering mechanism whereby the head lights may be shifted in position when the front vehicle wheels are moved for steering the vehicle, thus throwing the rays of light from the respective lamps directly into the paths of the front wheels so as to illuminate the road to the best advantage.

A salient feature of the present invention consists of means for retaining each head light in a fixed position relative to the vehicle at such times as it is not desired to move the head light by the steering gear, as during the day time and when the vehicle is at rest. The retaining or locking means for each head light is simple, efficient and positive in action, and said means is easily operated by the driver.

Another part of the invention consists of means for imparting movement to the head light when operatively connected with the steering gear of a vehicle, and a further feature consists of improved means for connecting the two head lights whereby they are adapted for simultaneous adjustment.

Other features of construction and advantages of the invention will appear in the course of the detailed description to be hereinafter given.

In the accompanying drawings we have illustrated one practical embodiment of the invention, but the construction shown therein is to be understood as illustrative, only, and not as defining the limits of the invention.

Figure 2:
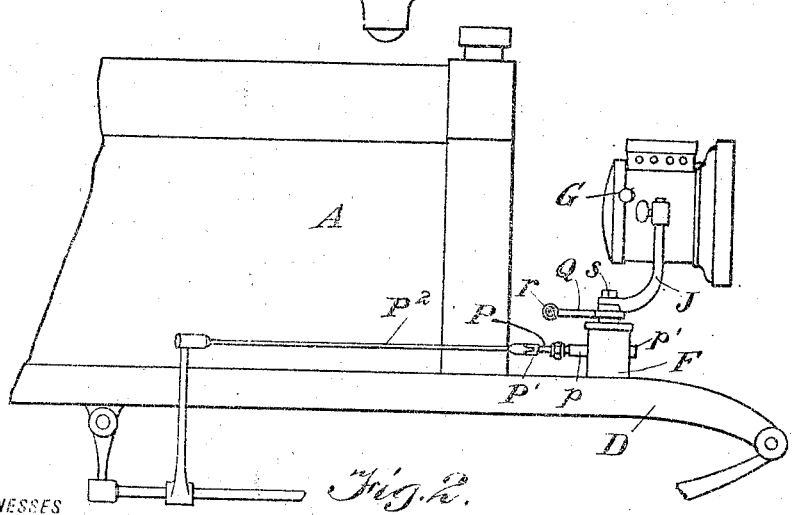

Figure 1 is a plan view of the front portion of a motor vehicle illustrating the means for supporting and adjusting the head lights as embodied in our invention. Fig. 2 is a side elevation of the parts shown in Fig. 1, illustrating one of the head lights. Fig. 3 is an enlarged view in side elevation illustrating a supporting bracket, a part of the head light supporting means, and certain of the operative parts employed in connection therewith. Fig. 4 is a vertical section through a supporting bracket illustrating a locking means for the lamp supporting spindle adjusted to release said spindle and permit it to turn freely within the supporting bracket. Fig. 5 is a view somewhat similar to Fig. 4 illustrating the locking means adjusted to a position for retaining the lamp supporting spindle against rotary movement, whereby the head light is precluded from adjustment. Fig. 6 is a horizontal section on the line 6—6 of Fig. 4, and Fig. 7 is another horizontal section on the line 7—7 of Fig. 4.

In Figs. 1 and 2 we have shown so much of an automobile as is necessary for an understanding of the invention. A indicates a front part of the vehicle, B the steering wheels, C a part of the steering mechanism, and D a part of the running gear or supporting springs. These several features are usual in automobile construction and constitute no part of our invention.

E, F are supporting brackets for two head lights, one of which is indicated at G in Fig. 2. The supporting brackets are attached to the front part of the vehicle in any usual or preferred way, said brackets being positioned between steering wheels, B, nearly in front of said wheels, although the particular position of the brackets is not important, for the reason that said brackets may be supported on any suitable front part of the vehicle. The brackets, E, F, and the devices associated therewith are similar in construction so that a description of one bracket and its associated parts will answer for the other. Each bracket is shown more clearly in Figs. 3 to 7, inclusive, of the drawings, by reference to which it will be seen that said bracket embodies in its construction a chambered shell or casing, $e$, the same being preferably cast in a single piece of metal. As shown, the bracket is substantially circular in cross section, and the bottom portion, $e'$, of the bracket is in the form of a head which is cast in one piece with the cylindrical shell, the top end of the bracket being open. The bracket is provided with a female thread, $e^2$, into which is screwed a male threaded flange, $f$, on a removable head, $f'$, said head being detachably connected to the upper open end of the bracket for the purpose of closing said end. The interior construction of shell or casing, $e$, is as follows: A chamber, $g$, is provided in the upper part of shell or casing, $e$, and below this chamber is a shoulder, $g'$, which produces a smaller chamber, $g^2$, the two chambers, $g$, $g^2$, being in communication. The closed lower end or head, $e'$, is provided with a socket, $h$, which is square or polygonal in shape. In addition to the socket, $h$, bottom member or head, $e'$, of the casing is provided with a threaded hole, $h'$, into which is screwed a conical pointed bearing screw, H, the latter being adapted to form a step bearing for a spindle, I. Said spindle, I, is mounted within casing, $e$, for rotation freely therein at certain times, but at other times the spindle is locked or retained against rotary movement. The spindle supports or carries a spider, J, for the lamp or head light, and to this end the upper part of the spindle is extended through an opening provided centrally in removable cap, $f'$, of the bracket shell or casing. The spindle is cylindrical for the major part of its length, but the lower part of said spindle is made square or polygonal in cross section, as at $i$ in Figs. 4, 5, and 6 of the drawings, the lower extremity of the spindle being provided with a central recess adapted to receive the conical end of bearing screw, H. From this description it will be apparent that the lower end of the spindle is supported by the bearing screw, and that a cylindrical part of the spindle fits snugly in a central aperture provided in cap, $f'$, whereby the spindle is mounted in the shell or casing for rotation with respect to two bearing points.

For the purpose of securing free rotation of the spindle and supporting it steadily in operative position within the shell or casing, we prefer to employ a roller bearing herein shown as a sleeve, $k$, and a series of rollers, $k'$. The sleeve fits loosely upon a cylindrical part of spindle, I, so that the bearing rollers, $k'$, will coöperate with the sleeve and with depending flange, $f$, of cap $f'$. The spindle is shown as having a collar, $i'$, upon which rests the sleeve, $k$, whereby endwise movement of the spindle in an upward direction is precluded by engagement of collar, $i'$, with sleeve, $k$. The roller bearing may be of any suitable or desired construction, and we may omit said bearing, or employ it, as may be deemed most expedient.

L designates a locking member square or polygonal in cross section and in the form of a sleeve, whereby the locking member is fitted slidably on the square or polygonal end portion, $i$, of spindle, I. The locking member is thus mounted on the spindle for rotation therewith, and it is adapted to slide lengthwise on the square part of the spindle. The locking member is positioned to enter the square or polygonal socket, $h$, in the bottom portion of casing, $e$, as shown in Fig. 5, whereby the locking member is adapted to coöperate with the socket for the purpose of precluding rotary motion of spindle, I, thus locking said spindle against rotary movement within the casing.

Means are provided for lifting the locking member above socket, $h$, in order that the locking member and the spindle may rotate within the casing when it is desired to adjust the head light which is carried by the spindle. Said means for adjusting the locking member in one direction is embodied in the form of a yoke, $l$, positioned within chamber, $g^2$, of the casing, said yoke being shown as having an arm $l'$, pivoted by a pin, $l^2$, within a recess, $l^3$, at one side of the casing; see Figs. 4, 5, and 7. The adjusting yoke straddles or embraces locking member, L, and this yoke is adapted to be lifted by the operation of a cam, $m$, which is carried on a rock shaft, M. Said rock shaft is mounted for rotation in the casing, and to a protruding end of the rock shaft is fastened an operating arm, M', see Fig. 3. At the free end of the arm is provided a knob, $m'$, having a locking pin, $m^2$, adapted to engage with aperture, $m^3$, in a plate, $m^4$, secured to the outside of casing, $e$, as shown in Fig. 3. It is evident, however, that the means for adjusting the rock shaft and for retaining said shaft and the cam in operative positions may be varied by a skilled constructor. When the arm, M', is shifted in one direction, shaft, M, is turned to elevate cam, $m$, and thus throw yoke, $l$, in an upward direction, whereby locking member, L, is lifted into chamber, $g^2$, and out of engagement with socket, $h$, thus permitting the spindle to rotate. The adjustment of the arm, rock shaft and cam in an opposite direction, however, allows the locking member to be lowered within chamber, $g^2$, and to fit within socket, $h$, whereby the locking member is held against rotation by engagement with the walls of the socket, and spindle, I, is thus precluded from rotating within the casing. The downward movement of the locking member upon the square or polygonal part of spindle, I, is facilitated by the action of a spring, N, which spring acts to retain the locking member in engagement with the walls of socket, h, when it is desired to preclude the spindle from rotation. As shown, spring, N, is coiled loosely around spindle, I, one end of the spring engaging with collar, i', of the spindle. The other end of said spring is seated against an end portion of locking member, L, or upon a gear, O, attached to the locking member or sleeve L.

Gear, O, forms one element of the mechanism by which the spindle is connected operatively with the steering gear, whereby the spindle and the head light are adapted to be rotated when the front wheels of the vehicle are shifted by the action of the steering gear, it being assumed that the spindle is released by adjustment of the locking member, L, out of engagement with socket, h. The casing, e, associated with bracket, F, of head light, G, is shown as having a transverse tubular guide, p, one end of which is closed by a head, p', and the other end of which is provided with a stuffing box, $p^2$, see Figs. 3 and 6. Within this tubular guide is operatively fitted a rod, P, having a series of gear teeth, $P^4$, constituting a rack. The rack of rod, P, is positioned for engagement with the teeth of gear, O, and when the rack is moved in one direction or the other, it operates to impart rotary movement to gear, O. Gear, O, may be mutilated or threaded for a part of its periphery, as shown in Fig. 6, or it may be continuously threaded around the entire periphery thereof as is evident. The operating stem, P, is provided with a forked end, P', to which is adapted to be connected a rod, $P^2$, which extends rearwardly from the head light and is connected in a suitable way with a part of steering gear, C, whereby the operation of steering gear, C, to shift the positions of front wheels, B, will, also, operate rod, $P^2$, and member, P, for the purpose of turning the gear, O, and member, L, whereby the lamp spindle, I, will be rotated within the casing, e, when member, L, is elevated, as shown in Fig. 4, so as to be free from engagement with socket, h.

It will be understood that the spindle and head light associated with bracket, F, are connected by the gear mechanism with the steering gear, but in order to insure the two head lights of brackets, E, F, moving simultaneously and to an equal extent, we employ means for connecting the spindle of bracket, F, with the spindle of bracket, E. Said spindle, I, of bracket, F, is provided with a rearwardly extending arm, Q, the same having a ball shaped head, q, at its outer end. The spindle associated with bracket, E, is provided with a similar rearwardly extending arm, Q', the free end of which is furnished with a similar ball-shaped head. Between the arms, Q, Q', of the two spindles of brackets, E, F, extends a rod, R, which is provided with sleeves, r, at the respective ends thereof. Said sleeves are furnished with slots and with ball shaped sockets, whereby the ball shaped ends, q, of arms, Q, Q', are operatively fitted in the sockets of sleeves, r, on the connecting rod, R. From this description it is apparent that the operation of connecting mechanism, P, $P^2$, by the steering gear will turn the spindle, I, of bracket, F, and the motion of this spindle will be communicated by arm, Q, and rod, R, to the arm, Q', of the spindle mounted in bracket, E, whereby the two spindles will rotate in their bearings or brackets, E, F, for the purpose of simultaneously shifting the two head lights in accordance with the adjustment of steering wheels, B, thus throwing the rays of light from the lamps or head lights directly into the paths of said wheels.

It will be understood that the spindles of the head lights are adapted to be locked in position by the driver when the head lights are not to be rotated by the operation of the steering mechanism. This locking operation is performed by turning the arms, M', so as to lower cams, m, and allow springs, N, to press the polygonal locking sleeves into sockets, h, of the respective brackets. Provision is thus made for retaining the lamps in fixed positions on the vehicle, and when the locking sleeve, L, of bracket, F, is lowered, the gear, O, moves downward with said locking sleeve, L, thus disengaging the gear from rack, P, whereby the reciprocating movement of rack, P, when actuated by the steering gear will not affect the gear nor the spindle, I, of the head light associated with bracket, F. Should the driver desire, however, to permit the steering gear to impart rotary motion to the head lights simultaneously with the adjustment of the front steering wheels it is necessary to operate arms, M', for the purpose of raising forks, l, and locking sleeves, L, thereby compressing springs, N, and placing the gear, O, of bracket, E, into mesh with the teeth of rack, P. This adjustment of the locking mechanism is performed by the driver before starting the vehicle, and thereafter the adjustment of the head lights in unison with the movement of the wheels is performed automatically by the means connecting one head light with the steering gear.

As shown in the drawings, each spider, J, consists of two upwardly extending arms fitted in sockets on the head light and held in position thereon by binding screws, see Figs. 2 and 3. The arms composing each spider are overlapped and interlocked, as shown in Fig. 3, and the two spider arms with arm, Q or Q', are fitted on an upward protruding part of spindle, I, whereby the two spider arms and arm, Q, are adapted to be held fixedly by a single nut, s, which is screwed upon the upper end of the spindle.

From the foregoing description it is apparent that we have provided simple, efficient and positive means for locking and releasing the operating spindle of each head light, said operating means being housed or contained wholly within the casing. The mechanism is thus protected from the accession of dust and moisture, and the parts are easily assembled and removed. The lamp supporting and operating mechanism is capable of application to any vehicle, and the entire mechanism may be constructed and installed economically and quickly without requiring a special construction of the vehicle itself.

Having thus fully described the invention, what we claim as new, and desire to secure by Letters Patent is:

1. In a device of the class described, a supporting member, a lamp carrying member mounted thereon, an operating member adapted to be moved by a vehicle running gear, a rotative lamp-turning member coöperating with said lamp-carrying member and the operating member, said rotative lamp-turning member being movable relatively to the operating member so as to be disengaged therefrom, and means for locking the lamp-carrying member from rotative movement when the rotative lamp-turning member is disengaged from the operating member.

2. In a device of the class described, a lamp-carrying member; an operating member adapted to be moved by a vehicle running gear, a lamp-turning member coöperating with the lamp-carrying member and with said operating member, said lamp-turning member being shiftable relative to said members, whereby it is disengaged from the one and retained in operative relation to the other, and separate locking means for restraining the lamp-carrying member from rotative movement when the lamp-turning member is moved to said disengaged position.

3. In a device of the class described, a chambered supporting member, a lamp-carrying member rotative therein, an operating member adapted to be moved by a vehicle running gear, a rotative member substantially incased within the chamber of said supporting member, said rotative member coöperating with the lamp-carrying member and the operating member, means for adjusting said rotative member relative to the lamp-carrying member and disengaging it from the operating member, and means for locking the lamp-carrying member from rotative movement when said rotative member is disconnected from the operating member.

4. In a device of the class described, a chambered supporting member, a lamp-carrying member rotative therein, an operating member adapted to be moved by a vehicle running gear, a rotative member substantially incased within the chamber of said supporting member, said rotative member coöperating with the lamp-carrying member and the operating member, adjusting means disconnected from the rotative member and coöperating therewith for moving said rotative member relative to the lamp-carrying member and the operating member, whereby said rotative member is disconnected from the one and retained in operative relation to the other, and means operable upon the disengaging adjustment of said rotative member for locking the lamp-carrying member from rotative movement.

5. In a device of the class described, a supporting member, a lamp operating spindle rotative therein, an operating member movable by the motion of a vehicle running gear, a rotative member slidable upon said spindle, whereby said member is adapted to be operatively connected to the operating member for imparting rotative movement to said spindle, means for adjusting said rotative member to disengage it from the operating member, and locking mechanism coöperating with the spindle for restraining it from rotative movement when said rotative member is disconnected from the operating member.

6. In a device of the class described, a supporting member, a lamp-operating spindle rotative therein, an operating member, a rotative member adapted to coöperate with said operating member, said rotative member being movable to two positions in one of which it is operable by said operating member for imparting rotative movement to the spindle, and in the other of which it is disconnected from said operating member, means for adjusting said rotative member, and locking means controllable by the adjustment of the rotative member and adapted to restrain said spindle from rotative movement when the rotative member is disengaged from the operating member.

7. In a device of the class described, a chambered supporting member, a lamp-operating spindle rotative in said member; said spindle having a part angular in cross section, means for imparting rotative movement to said spindle, a locking member slidable on the angular part of the spindle, said locking member being adapted for engagement with a part of the supporting member for restraining the spindle against rotative movement, and means for slidably adjusting the locking member.

8. In a device of the class described, a chambered supporting member having a socket, a lamp-operating spindle rotative in said member, means for imparting rotative movement to said spindle, a locking member slidable upon the spindle, and means for adjusting the locking member into and out of the socket within the supporting member.

9. In a device of the class described, a chambered supporting member having a socket, a lamp-operating spindle rotative in said member, a locking sleeve movable on the spindle into and out of engagement with the socket, said sleeve having a gear, a rack adapted to mesh with the gear and to impart rotative movement to the spindle, a spring for moving the sleeve in one direction, and means for adjusting the sleeve in an opposite direction.

10. In a device of the class described, a supporting member, a lamp-operating spindle rotative relative thereto, an operating rack, a gear rotative with the spindle and meshing with the rack, means for adjusting said gear lengthwise of the spindle, thereby disconnecting said gear from the rack, and means for restraining the spindle from rotative movement.

11. In a device of the class described, a supporting member, a lamp-operating spindle rotative relative thereto, an operating rack, a gear rotative with the spindle and meshing with the rack, means for adjusting said gear lengthwise of the spindle, thereby disconnecting said gear from the rack, and locking means controllable by the gear and adapted to lock the spindle from rotative movement when said gear is disengaged from the rack.

12. In a device of the class described, a supporting member, a lamp-operating spindle rotative relative thereto, an operating rack, a gear rotative with the spindle and meshing with the rack, means for adjusting said gear lengthwise of the spindle, a spring opposing said movement of the gear, and means for locking the spindle from rotative movement upon the adjustment of the gear to a position free from said rack.

13. In a device of the class described, a supporting member, a lamp-operating spindle rotative relative thereto, an operating rack, a gear rotative with the spindle and meshing with the rack, a spring coöperating with the gear, a member pivoted independently of the gear, said pivoted member engaging with the gear for moving it in opposition to the spring and into a position to mesh with the rack, and means for locking the spindle.

14. In a device of the class described, a chambered casing, a spindle rotative therein, an operating rack, a gear positioned within the chamber of the casing, said gear being fitted on the spindle and meshing with the rack, a member engaging the gear and positioned within the casing, means operated exteriorly of the casing for moving said member, and a spring coöperating with the gear for moving the same to a position free from the rack.

15. In a device of the class described, a chambered casing, a spindle rotative therein, an operating rack, a gear positioned within the chamber of the casing, said gear being fitted on the spindle and meshing with the rack, a member engaging the gear and positioned within the casing, the spring engaging the gear for moving it to a position disconnected from the rack, a cam for operating the member in opposition to the tension of the spring, and means for retaining the cam and gear-shifting member in adjusted positions, whereby the gear is retained in operative relation to the rack.

16. In a device of the class described, a chambered casing, a spindle rotative therein, an operating rack, a gear positioned within the chamber of the casing, said gear being fitted on the spindle and meshing with the rack, a spring acting on the gear, a member pivoted within the casing and coöperating with the gear for moving it along the spindle in a direction opposite to that in which said gear is moved by the spring, a cam shaft coöperating with the pivoted member, and means for retaining the cam shaft in adjusted position whereby the gear is retained in mesh with the rack.

17. In a device of the class described, a chambered casing, a spindle rotative therein, an operating rack, a gear positioned within the casing, said gear being rotative with the spindle and slidable thereon, means for moving said gear to a position free from engagement with said rack, adjusting means coöperating with the gear for retaining it in mesh with the rack, and means controllable by the sliding movement of the gear and operating to lock the spindle from rotative movement when said gear is free from the rack.

18. In a device of the class described, a chambered casing, a spindle stepped in said casing, anti-friction bearings whereby the spindle is adapted for free rotative movement relative to the casing, an operating rack, a gear rotative with said spindle and slidable thereon, a spring operating the gear to slide it to a position disconnected from the rack, adjusting means for moving the gear and retaining it in mesh with the rack, and locking means controllable by the sliding adjustment of the gear for restraining the spindle from rotative movement when said gear is disconnected from the rack.

19. In a device of the class described, a supporting member having a socket, an operating member adapted to be moved by a vehicle running gear, a lamp spindle rotative relative to said supporting member, and a rotative lamp-turning member carried by said lamp spindle and movable relative to the operating member so as to be disengaged therefrom, said lamp-turning member being adapted for engagement with the socket of the supporting member when it is disengaged from said operating member, whereby the lamp-turning member is locked against rotation and it operates to preclude rotative movement of the lamp spindle.

20. In a device of the class described, a supporting member having locking means, a lamp operating spindle rotative relative to said supporting member, a rotative lamp-turning member slidably mounted on said spindle, means coöperating with said lamp-turning member and the running gear of a vehicle whereby said lamp-turning member may be rotated in unison with the movement of the vehicle running gear when said lamp-turning member occupies a predetermined position on a spindle, and means for disengaging said lamp-turning member from the vehicle coöperating means and positioning said lamp turning member into engagement with the locking means of the supporting frame, whereby said spindle will be locked in a fixed position relative to said supporting member.

21. In a headlight, a spindle, means for imparting rotative movement to the spindle, said means including a reciprocating member and a rotative member, means for disengaging the rotative member from the reciprocating member, and means for locking the rotative member and the spindle from rotative movement when said rotative member is disengaged from the reciprocating member.

22. In a headlight, a spindle, a sliding and rotatable member coöperating therewith, means for imparting rotative movement to said member, means for adjusting the member lengthwise of the spindle, and means for locking the member from rotative movement when so adjusted.

23. In a headlight, a spindle, an operating member adapted to be actuated by a steering gear, locking means, and a shiftable and rotatable member adapted in one position to coöperate with the locking means and the spindle to restrain the spindle from rotative movement, and in another position to coöperate with the operating member and the spindle for imparting rotative movement to said spindle.

In testimony whereof we have signed our names to this specification in the presence of two subscribing witnesses.

OTIS B. WOODFIELD.
OTTO M. MORRIS.
JOHN W. GOSLING.

Witnesses:
HENRY S. OSBORN,
HELEN M. TAYLOR.